United States Patent
Horiuchi et al.

[11] Patent Number: 5,877,878
[45] Date of Patent: Mar. 2, 1999

[54] SURVEILLANCE METHOD OF OPTICAL AMPLIFIER-REPEATER TRANSMISSION SYSTEM

[75] Inventors: Yukio Horiuchi, Niza; Shu Yamamoto, Shiki; Shigeyuki Akiba, Tokyo, all of Japan

[73] Assignee: Kokusai Denshin Denwa Kabushiki Kaisha, Tokyo, Japan

[21] Appl. No.: 757,290

[22] Filed: Nov. 27, 1996

[30] Foreign Application Priority Data

Nov. 30, 1995 [JP] Japan .................................. 7-334174

[51] Int. Cl.⁶ .................................................. H04B 10/02
[52] U.S. Cl. ........................ 359/110; 359/127; 359/166; 359/174; 359/177
[58] Field of Search ................................ 369/110, 127, 369/166, 177, 124–134, 174–179

[56] References Cited

U.S. PATENT DOCUMENTS

| | | | |
|---|---|---|---|
| 4,727,601 | 2/1988 | Konishi | 359/166 |
| 5,296,957 | 3/1994 | Takahashi et al. | 359/177 |
| 5,436,746 | 7/1995 | Hirst | 359/110 |
| 5,500,756 | 3/1996 | Tsashima et al. | 359/174 |
| 5,790,294 | 8/1998 | Horiuchi et al. | 359/177 |

*Primary Examiner*—Edward Lefkowitz
*Attorney, Agent, or Firm*—Pollock, Vande Sande & Amernick

[57] ABSTRACT

The purpose of the invention is to detect a surveillance signal in a shorter time without lowering the usable merit of wavelength. The transmission signal transmitting through the optical fiber transmission lines is specified as a light FDM signal multiplexed in wavelength, and the surveillance light signal is interposed in the middle of two adjacent channel slots. The surveillance light signal is produced such that the spread spectrum is applied to the surveillance carrier and thereby a light signal is modulated in intensity. The light FDM signal and surveillance light signal are turned to the facing transmission lines in the optical repeaters to be received by each terminal station, and the modulation rate of the surveillance light signal can be made deeper so that the surveillance signal can be detected in a shorter time.

8 Claims, 4 Drawing Sheets

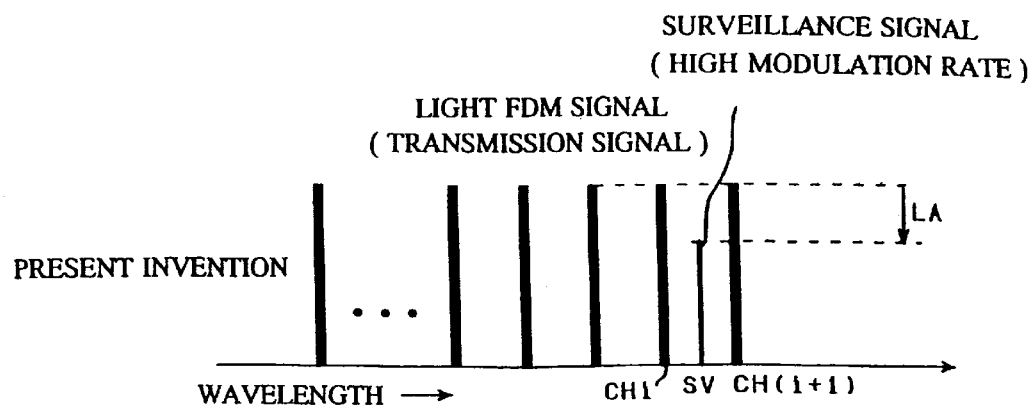
FIG.1
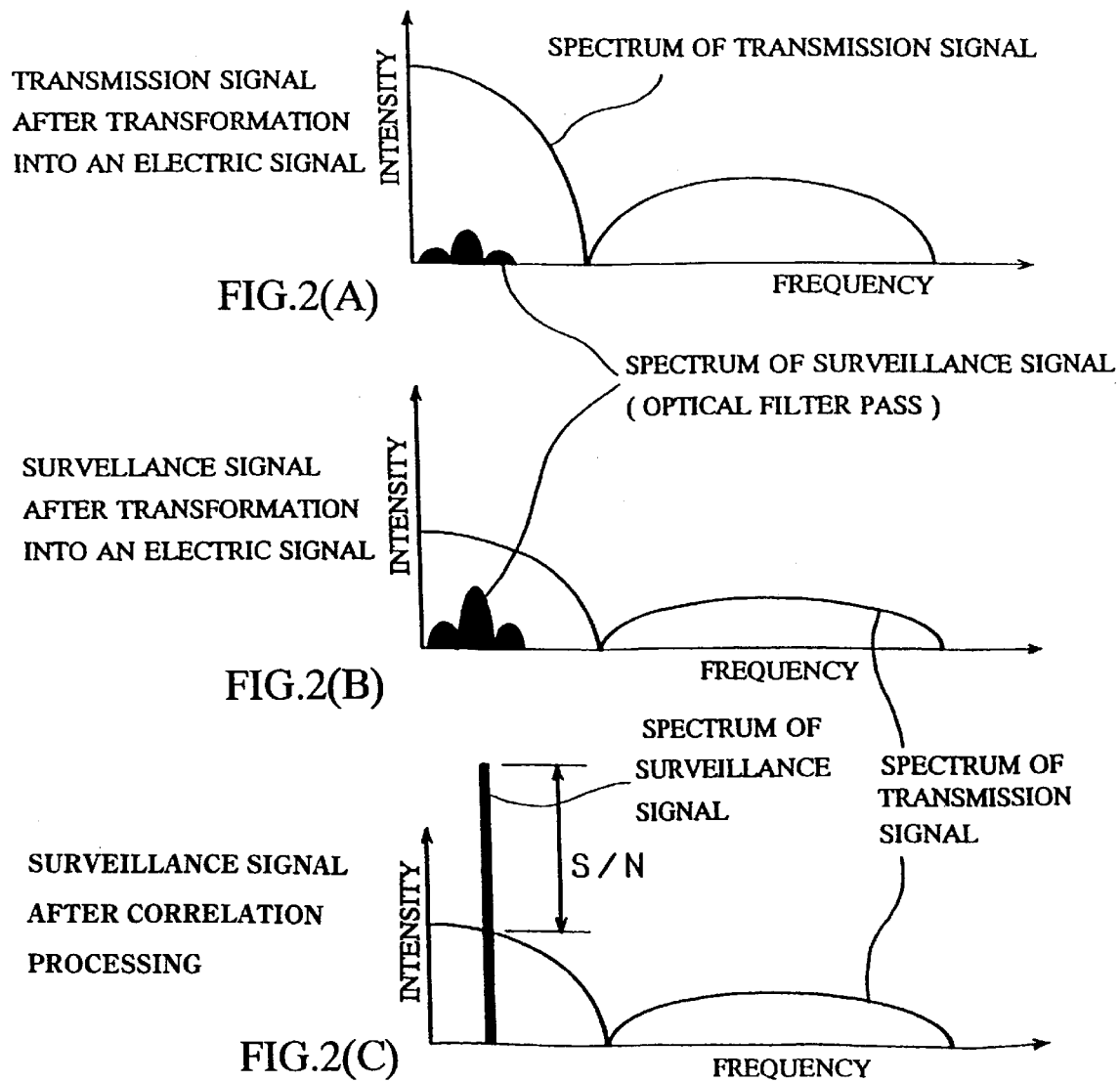
FIG.2(A)
FIG.2(B)
FIG.2(C)

SURVEILLANCE METHOD OF OPTICAL AMPLIFIER-REPEATER TRANSMISSION SYSTEM

BACKGROUND OF THE INVENTION

1. Field of the Invention

The present invention relates to a surveillance method of an optical amplifier-repeater transmission system that is designed to survey troubles in optical repeaters and optical fiber transmission lines in a long-distance relay system using optical amplifiers such as a submarine optical fiber cable system.

2. Description of the Related Art

An optical communication system using optical fiber cables is applied to a long-distance transmission system such as a submarine optical fiber cable system; and if trouble occurs in such a submarine optical fiber cable system, a quick recovery is strongly required because of the potential huge influence to the information society.

Generally, the submarine optical fiber cable system is composed of optical repeaters and optical fiber cables, and the cable can possibly be damaged by a human activity such as fishing or anchoring and the optical repeater can fall in trouble due to a failure of the electric circuit. In order to eliminate such a trouble in its earliest stages, it is most important to locate the optical cable or optical repeater fallen in trouble.

Conventionally in the optical communication system, the regenerative relay system is used which a light signal transmitted through an optical fiber cable is transformed into an electric signal in an optical repeater to perform waveform shaping and reproducing, and the electric signal is again transformed into a light signal to be sent out. Recently, however, an optical amplifier-repeater transmission system has been developed in which a light signal transmitted through an optical fiber cable is directly amplified to be sent out by an optical amplifier.

As a surveillance method of the transmission line that exploits a property of the optical amplifier-repeater transmission system to amplify a light signal optically directly without regeneratively repeating, an optical turn method is disclosed (for example, in Japanese Patent Official Publication, JP-A-5-344067 and JP-A-6-204949).

This surveillance method can detect a repeater section that is in trouble by always circulating a turned signal for surveillance from the optical repeater via the transmission line. This optical turn method will be described with reference to a block diagram showing a construction of the optical amplifier-repeater transmission system shown in FIG. 6(A). The optical turn method is designed to detect troubles in the repeaters or in optical fibers between the repeaters, whereby a light signal transmitting on one of the transmission lines and having surveillance signal superimposed is turned with a specific attenuation to the other transmission line.

In FIG. 6(A), it is assumed that the direction facing to a receiving terminal station 124a from a transmitting terminal station 123a is the ascent and the direction facing a receiving terminal station 124b from a transmitting terminal station 123b is the descent. 112a~112z are ascent optical fiber transmission lines, 113a~113z are descent optical fiber transmission lines, 116a~116n are optical repeaters provided at each specific distance on the ascent optical fiber transmission lines 112a~112z and the descent optical fiber transmission lines 113a~113z, 117n and 118n are optical amplifiers provided in the optical repeater 116n, 119n and 120n are optical couplers provided in the optical repeater 116n, 121n and 122n are attenuators provided in the optical repeater 116n, An is an optical turn circuit composed of the optical coupler 119n, attenuator 121n, optical coupler 120n, and attenuator 122n connected in a loop, 123a and 123b are transmitting terminal stations, and 124a and 124b are receiving terminal stations.

Furthermore, the optical repeaters 116a~116n are all identical in circuit, and only the optical repeater 116n is illustrated in detail.

In the optical amplifier-repeater transmission system thus constructed, each of the transmitting terminal stations 123a, 123b sends out a main line light signal, on which a surveillance signal is superimposed, as a transmission signal to each of the ascent and descent optical fiber transmission lines 112a, 113z. Each of the main line light signals sent out to the ascent and descent optical fiber transmission lines 112a, 113z is repeatedly optically amplified in the optical repeaters 116a~116n, and transmits through the ascent optical fiber transmission line 112a~112z or the descent optical fiber transmission line 113z~113a to be received by each of the receiving terminal stations 124a, 124b.

The main line light signals are attenuated to a specific level transmitting through the optical turn circuits Aa~An provided in the optical repeaters 116a~116n, and are turned to the facing optical fiber transmission lines. Each of the turned signals transmits through the ascent optical fiber transmission line 112a~112z, or the descent optical fiber transmission line 113z~113a to the corresponding receiving terminal station 124a or 124b on the transmission lines, respectively.

Next, how the light signal is turned will be described in an example of the optical repeater 116n. The main line light signal transmitted through the ascent optical fiber transmission line 112n is optically amplified by the optical amplifier 117n to enter the optical coupler 119n. A part of the main line light signal is split in the optical coupler 119n, and attenuated to a specific level by the attenuator 122n to enter the descent optical coupler 120n. The light signal thus attenuated is superimposed as a turned signal on the descent main line light signal transmitting through the descent optical fiber transmission line 113n. Thus, the ascent main line light signal is turned to the descent optical fiber transmission line 113n.

This function is the same in the descent main line light signal. Namely, the main line light signal transmitted through the descent optical fiber transmission line 113(n+1) is optically amplified by the optical amplifier 118n to enter the optical coupler 120n. A part of the main line light signal is split in the optical coupler 120n, and attenuated to a specific level by the attenuator 121n to enter the ascent optical coupler 119n. The light signal thus attenuated is superimposed as a turned signal on the ascent main line light signal transmitting through the ascent optical fiber transmission line 112(n+1). Thus, the descent main line light signal is turned to the ascent optical fiber transmission line 112(n+1).

Assuming that the coupling attenuation of the optical coupler 119n and 120n is designed to be, for example, 10 dB, and the attenuation of the attenuator 121n and 122n is designed to be, for example, 25 dB, the light signal transmitted through the ascent optical fiber transmission line 112n is attenuated by 45 dB to be turned to the descent optical fiber transmission line 113n as a turned signal. In the same manner, the light signal transmitted through the descent optical fiber transmission line 113n is attenuated by 45 dB to be turned to the ascent optical fiber transmission line 112n as a turned signal.

In this case, extracting the surveillance signal out of the turned signal and measuring the signal intensity enables the detection of the repeater section in which the optical repeaters or optical fiber cables are in trouble.

As a means to extract the surveillance signal out of the turned signal at the receiver stations 124a, 124b, a method is applied which finds an autocorrelation coefficient between the surveillance signal superimposed on the transmission signal at the transmitting terminal stations 123a, 123b and the received turned signal.

Thus, extracting the surveillance signal out of the turned signal at the receiving terminal stations 124a, 124b gives high level surveillance signals at each delay time corresponding to each location of the optical repeaters. The peak levels of the surveillance signals indicate turned signals from the optical repeaters. Continuously measuring (surveying) the peak levels corresponding to the locations of the repeaters and investigating level variations by comparing these peak levels with the levels measured immediately after the optical fiber cable was installed leads to detecting troubles in the optical repeaters or optical fiber transmission lines.

The surveillance method of optical amplifier-repeater transmission system shown in FIG. 6(A), however, has the following problems. FIG. 6(B) illustrates a state wherein turned signals La~Ln are superimposed on the ascent or descent main line light signal LCH in this surveillance method. Although, in this figure, the main line light signal LCH and the turned signals La~Ln are shown in different wavelengths, this is only for easy understanding, practically they have an identical wavelength. Because the main line light signal and turned signals are regulated to have an identical wavelength, the turned signal must be reduced to a level that does not give any influence to the main line light signal (attenuation requirement).

Furthermore, the surveillance signal superimposed on the main line light signal is regulated to have a low modulation rate so as not to influence the main line light signal, and therefore, received surveillance signals at the receiving terminal stations 124a, 124b become very low levels. Therefore, it takes long time to receive a signal of good S/N ratio from among weak turned surveillance signals.

To solve this problem, providing an exclusive surveillance channel can raise the modulation rate of the surveillance signal and can receive the surveillance signal of a good S/N ratio in a shorter time. However, in the wavelength-multiplexed optical transmission system aiming at increasing the transmission capacity by multiplexing multiple optical transmission signals, to avoid interference between a light signal of the exclusive surveillance channel and a light transmission signal, it becomes necessary to secure a wavelength band for the exclusive surveillance light signal in the limited light transmission band in the same manner as the light transmission signal. Consequently, a band has to be allocated for the exclusive surveillance signal, whereas the band should be used primarily for the transmission signal. Therefore, the transmission capacity will be limited, which lowers the economic efficiency.

This is stated also in "Supervisory signal transmission method for optical amplifier repeater system", IEEE GLOBECOM '90, 903.2, 1990.

Still, allocating the surveillance signal outside the band can be considered, however, it is generally known that the wavelength gain characteristics of the optical amplifier varies depending on the magnitude of input light power and the excited light intensity of an optical fiber amplifier. Generally, in a repeater system with optical amplifiers of identical characteristics connected in multiple stages, the wavelength gain characteristics are accumulated; and the multi-stage connection confines the possible repeater band, and a large gain difference occurs between a gain at a wavelength giving the peak gain and a gain at a wavelength at band edges. In view of these points, assuming the measurement of the band edge or outside of the band to be the gain characteristics within the band of the optical amplifier is imperfect in surveying the system.

SUMMARY OF THE INVENTION

The present invention has been made in view of the foregoing problems, and an object of the present invention is to provide an efficient surveillance method of an optical amplifier-repeater transmission system that can detect a surveillance signal in a shorter time in a good S/N ratio.

In order to accomplish the aforementioned object, the surveillance method of the optical amplifier-repeater transmission system according to one aspect of the invention, in the optical amplifier-repeater transmission system constructed by interposing optical repeaters in which a pair of ascent and descent optical amplifiers are incorporated into a pair of ascent and descent optical fiber transmission lines, an ascent and descent transmission signal transmitted through a pair of the ascent and descent optical fiber transmission lines comprise a plurality of optical channel slots arrayed on the wavelength axis and at least one surveillance light signal interposed into a wavelength band between the optical channel slots. In the optical repeaters, optical turn circuits are provided which turn the ascent transmission signal to the descent optical fiber transmission line with an appropriate loss and turn the descent transmission signal to the ascent optical fiber transmission line with an appropriate loss. The surveillance of the optical repeaters and optical fiber transmission lines are performed such that the surveillance light signals contained in the signals turned in the optical repeaters are extracted in an ascent and descent terminal station equipment.

In the surveillance method of the optical amplifier-repeater transmission system according to another aspect of the invention, the surveillance light signal is produced in such a manner that a light signal is modulated in intensity by a surveillance carrier with a spread spectrum applied.

Furthermore, in the surveillance method of the optical amplifier-repeater transmission system, according to another aspect of the invention, a plurality of surveillance light signals are interposed between the light channel slots always or for a specific time, and the surveillance light signals are received in the ascent and descent terminal station equipment with all the surveillance light signals or by switching so as to synchronize with the time that the surveillance light signals are interposed between the light channel slots.

Moreover, in the surveillance method of the optical amplifier-repeater transmission system, according to another aspect of the invention, the wavelength of the foregoing surveillance light signal is set in a wavelength band close to a wavelength giving a maximum gain of the gain vs. wavelength characteristics of the optical amplifier in the optical repeater.

According to the invention thus constructed, an intensity-modulated surveillance light signal is interposed between optical channel slots; and even if the modulation rate of the surveillance light signal is made higher than the conventional, the interference to light channel slot signals can be restrained as much as possible. Thereby, the surveillance light signal of a good S/N ratio can be received in a shorter time.

Furthermore, since a new wavelength band exclusive for surveillance is not required, the wavelength band can be used effectively.

Moreover, spreading the spectrum of the surveillance carrier signal spreads frequency components of the surveillance light signal modulated in intensity by the surveillance carrier signal and lowers the spectrum power density thereof; and therefore, the interference to the channel slot signals can be minimized.

BRIEF DESCRIPTION OF THE DRAWINGS

The present invention will be fully understood from the detailed description given below and from the accompanying drawings of the preferred embodiments of the invention, which, however, should not be taken to limit the specific embodiment, but are for explanation and understanding, in which:

FIG. 1 illustrates an arrangement of channel slots in the surveillance method of the optical amplifier-repeater transmission system according to the present invention;

FIG. 2 (A) illustrates spectra of a transmission signal after transformation into an electric signal of a transmission signal and surveillance signal in the surveillance method of the optical amplifier-repeater transmission system according to the present invention;

FIG. 2 (B) illustrates spectra of a surveillance signal after transformation into an electric signal of a transmission signal and surveillance signal in the surveillance method of the optical amplifier-repeater transmission system according to the present invention;

FIG. 2 (C) illustrates spectra of a surveillance signal after correlation processing and surveillance signal in the surveillance method of the optical amplifier-repeater transmission system according to the present invention;

FIG. 6 (B) is a block diagram showing a state wherein turned signals $La \sim Ln$ are superimposed on the main line light signal $L_{CH}$ of a construction of the optical amplifier-repeater transmission system according to the prior art.

DESCRIPTION OF THE PREFERRED EMBODIMENT

As shown in FIG. 1, the transmission signal is a wavelength-multiplexed light transmission signal (light FDM signal) where each channel slot (CH) is multiplexed in wavelength, and the surveillance signal (SV) is interposed between CHi and CH(i+1). This surveillance signal is produced such that the spread spectrum of the surveillance carrier is performed by modulating the surveillance carrier in phase or frequency, or by modulating the carrier by modulation means such as the frequency hopping technique, and the surveillance light signal at a wavelength between adjacent channel slots is modulated in intensity by the spread spectrum surveillance carrier. The power level of the surveillance signal (SV) is regulated 10 dB lower than each channel power level.

Figure 6A:
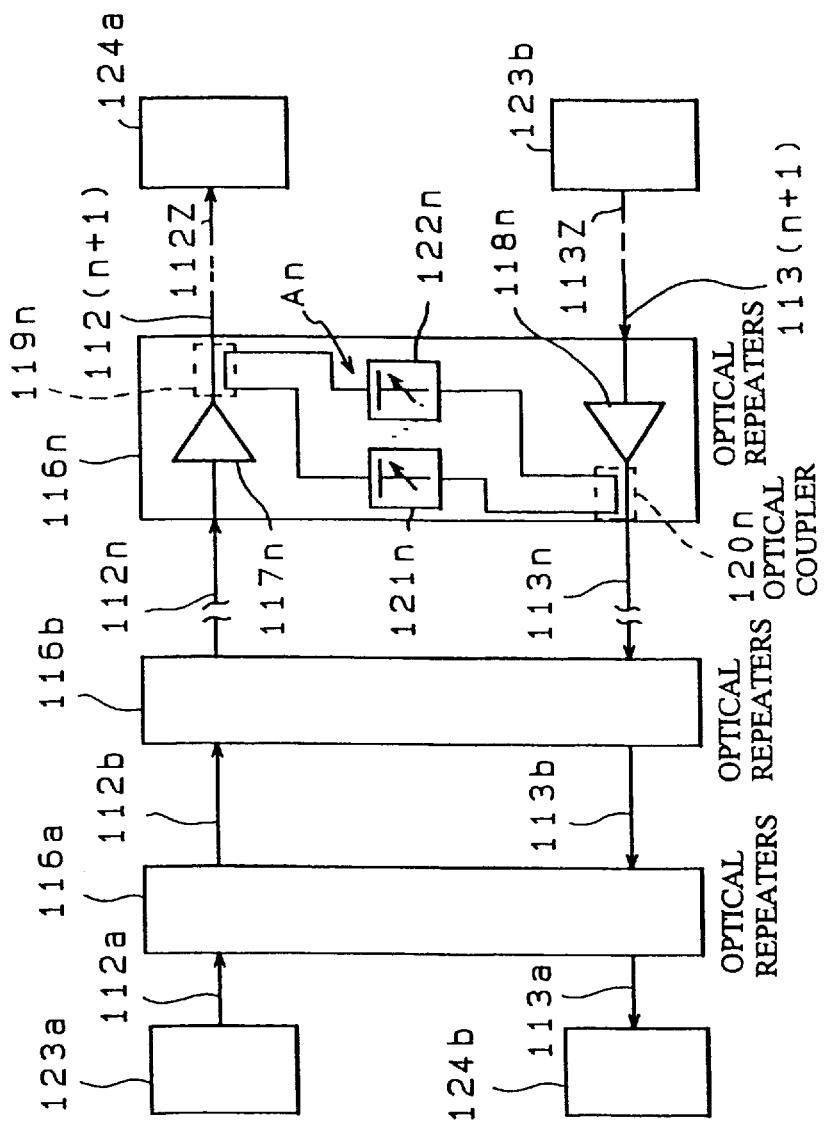
FIG. 6 (A) is a block diagram showing the optical turn method of a construction of the optical amplifier-repeater transmission system according to the prior art.
Figure 6B:
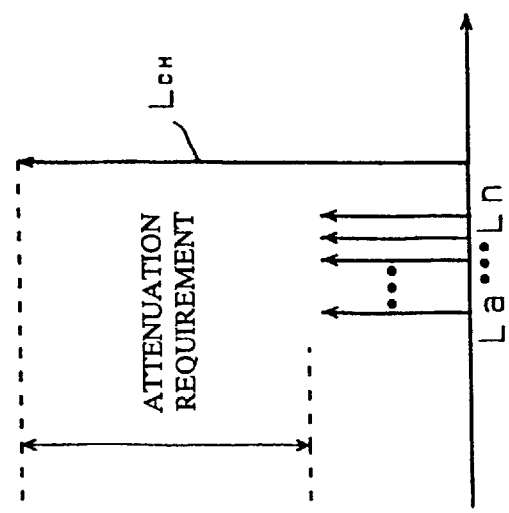

The construction of the optical amplifier-repeater transmission system according to the invention is the same as in FIG. 6. The light FDM signal containing the surveillance signal (SV) thus composed is turned to the facing optical fiber transmission line and the surveillance signal (SV) as well as the light FDM signal is received by the receiving terminal station. The received signal is split into two, and one is guided to a transmitting terminal equipment to demodulate the light FDM signal and the other one is guided to a surveillance equipment.

From the received signal guided to the transmitting terminal equipment, the light FDM signal is extracted through a built-in optical filter to be transformed into an electric signal. From the received signal guided to the surveillance equipment, the surveillance signal is extracted through a built-in optical filter to be transformed into an electric signal.

FIG. 2(A) illustrates a spectrum of the received signal at the transmitting terminal equipment in this case. It is seen from this figure that the spectrum of the surveillance signal is made lower in intensity than the spectrum of the light FDM signal as the transmission signal, and the frequency components of the surveillance signal are spread.

FIG. 2(B) illustrates a spectrum of the received signal at the surveillance equipment. As shown in this figure, the spectrum of the light FDM signal as the transmission signal is made lower in intensity than the spectrum at the transmitting terminal equipment, and the spectrum of the surveillance signal is made higher in intensity and the frequency components thereof are spread.

Furthermore, in the surveillance equipment, the reverse spread-spectrum processing (correlation processing) is applied to demodulate the surveillance signal, and the spectrum after demodulation is shown in FIG. 2(C). As seen in this figure, the spectrum of the surveillance signal is made a single spectrum, and the intensity thereof is made higher than that of the spectrum of the transmission signal, and the S/N ratio illustrated can be obtained in shorter time.

Thus, although the surveillance light signal modulated in intensity by the surveillance signal with the spread spectrum applied is interposed between two optional adjoining channel slots in plural light transmission signals transmitting through the optical fiber transmission line, the intensity of the surveillance light signal is made lower than the light transmission signal. Also, the frequency components of the surveillance light signal are spread and the spectrum power density is made lower. Therefore, if there occurs any interference in the light region of the optical fiber transmission line or the like, the interference in the electric stages after opto-electric transformation becomes minute. Furthermore, since the modulation rate of the surveillance light signal can be made higher, the surveillance signal can be detected in a shorter time.

In this case, the surveillance can be performed without expanding the frequency spacing between light transmission signals; and therefore, the light frequency band can be saved and the transmission capacity can be increased.

Moreover, it is possible to measure and survey a level at an optional light frequency inside the transmission band of the optical fiber transmission line of the optical amplifier built in the optical repeater; and therefore, the gain characteristics of the optical amplifier in wavelength band can be found.

The surveillance signal is not limited to one signal, and plural surveillance signals can be interposed respectively between two optional adjoining channel slots.

Figure 3:
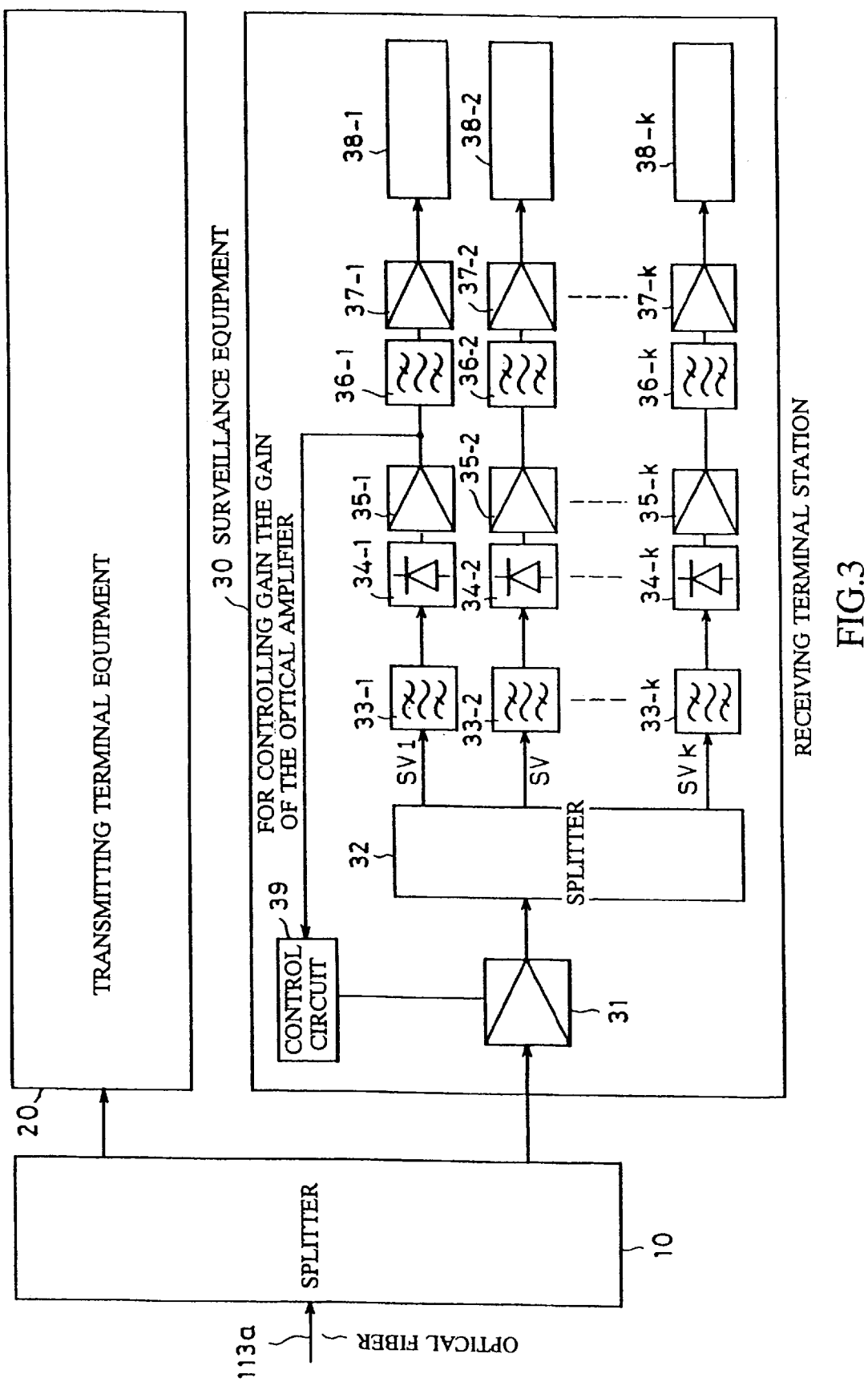
FIG. 3 is a block diagram showing a construction of a receiving terminal station in the surveillance method of the optical amplifier-repeater transmission system according to the present invention.

Next, FIG. 3 illustrates a construction of a receiving terminal station in which the surveillance method of the optical amplifier-repeater transmission system according to the invention is applied, and the construction is the same as the one illustrated in FIG. 6 as described above; referring to FIG. 6 as well, the surveillance method will now be described.

Since the receiving terminal station 124a for receiving the ascent transmission signal has the same construction as the receiving terminal station 124b for receiving the descent transmission signal, only the construction of the receiving terminal station 124b is illustrated in detail in FIG. 3.

In FIG. 3, 10 is a splitter for splitting a light signal received through the optical fiber transmission line 113a, 20 is a transmitting terminal equipment that receives the ascent main line light signal out of the split light signals and produces them for each channel slot to provide communication services, and 30 is a surveillance equipment that receives a turned surveillance signal out of the split light signals and detects the location of the optical repeaters 116a~116n and the optical fiber transmission lines 112a~112z, 113a~113z that has a trouble.

31 is an optical amplifier for amplifying the turned signal to a specific level, 32 is a splitter for splitting the output from the optical amplifier 31 for each channel slot, 33-1~33-k are bandpass filters each corresponding to each wavelength of the channel slots that extract the channel slot outputs from the splitter 32, 34-1~34-k are photodetectors each corresponding to each of the channel slots that transform the light output signals from the bandpass filters into electric signals, 35-1~35-k are amplifiers for amplifying electric output signals from the photodetectors 34-1~34-k, 36-1~36-k are bandpass filters for extracting the surveillance signal components superimposed on the turned signal from the output signals of the amplifiers 35-1~35-k, 37-1~37-k are amplifiers for amplifying the outputs from the bandpass filters 36-1~36-k, 38-1~38-k are signal processors each provided corresponding to each channel slot that receive the outputs from the amplifiers 37-1~37-k, and 39 is a control circuit for controlling the gain of the optical amplifier 31 in correspondence with the output of the amplifier 35-1.

Figure 4:
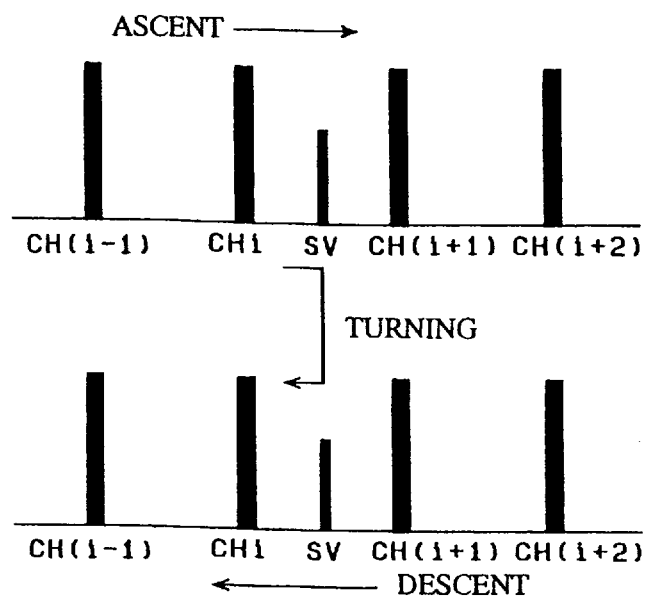
FIG. 4 illustrates one example of the arrangement of ascent and descent channel slots in the surveillance method of the optical amplifier-repeater transmission system according to the present invention.

In the foregoing construction, as shown, for example, in FIG. 4, a light signal transmitting through the ascent optical fiber transmission lines 112a~112z is turned to the descent optical fiber transmission lines 113a~113z at each of the optical repeaters 116a~116z. In FIG. 4, the upper/lower chart illustrates a channel slot arrangement of the ascent/descent transmission signal and a turned surveillance signal (SV). Here, the turned signal contains not only the turned surveillance signal (SV), but also a turned ascent transmission signal, and the level of the turned ascent transmission signal is made so low that it does not influence the descent transmission signal; and it is not illustrated in the figure. The surveillance signal (SV) shown in the lower chart, however, is illustrated at a remarkably higher level than the actual turned level for the convenience of explanation.

When same wavelengths are assigned to the ascent and descent channel slots as shown in FIG. 4, the turned surveillance signal (SV) and the channel slots of the descent transmission signal are not overlapped, and the surveillance signal turned from the descent transmission signal can be extracted easily by the bandpass filters 33-1~33-k of the surveillance equipment 30.

In the same manner, also in the transmitting terminal equipment 20 supplied with the received signal split by the splitter 10, the received signal is separated into light signals for each channel slot by built-in bandpass filters and transformed into electric signals for communication services.

In FIG. 3, there are k number of the surveillance signals SV1~SVk in the surveillance equipment 30, and the surveillance signals SV~SVk each are passed through the optical filters 33-1~33-k, and thereafter transformed into electric signals by the photodetectors 34-1~34-k and amplified by the amplifiers 35-1~35-k. The turned signals corresponding to each of the channel slots given by each of the amplifiers 35-1~35-k are supplied to the bandpass filters 36-1~36-k, whereby the surveillance signal components are extracted. The outputs of the bandpass filters 36-1~36-k are further amplified by the amplifiers 37-1~37-k, and supplied to each of the signal processors 38-1~38-k. Furthermore, the output of the amplifier 35-1 is supplied to the control circuit 39 to control the gain of the optical amplifier 31 so that the input light signal level to the photodetectors 34-1~34-k becomes constant.

In the signal processors 38-1~38-k provided respectively for corresponding ones of the surveillance signals, correlation detection processing is performed between the surveillance signals each turned from the optical repeaters 116a~116n for each of the surveillance signals and the spread spectrum signals of the carrier for the surveillance signals. Thereby, it becomes possible to detect the operation condition of the optical repeaters and the location of trouble that has occurred in the optical fiber transmission lines.

This is because the carrier for the surveillance signals is modulated by a pseudo-random serial signal such as a M-series PN signal.

The surveillance equipment according to a plurality of invention is provided with the surveillance circuits for k number of channels, however, it should be noted that one channel surveillance circuit can cover all the channels by varying the wavelength of the optical filter 33.

As described above, if the channel slots of the ascent and descent transmission signals are designed to coincide with an identical wavelength, respectively, the turned surveillance signal will have a different wavelength from that of the facing main line light signal; and even if the surveillance signal is made to turn with a higher level than the conventional, it will not give noises to the facing main line light signal. Therefore, the reception S/N ratio of the turned signal can be improved.

In this case, however, the ascent transmission signal turned has an identical wavelength to the channel slot of the descent transmission signal, and an interference will occur. Therefore, it is considered that the wavelength of channel slots of the ascent and descent transmission signals are made different.

Figure 5:
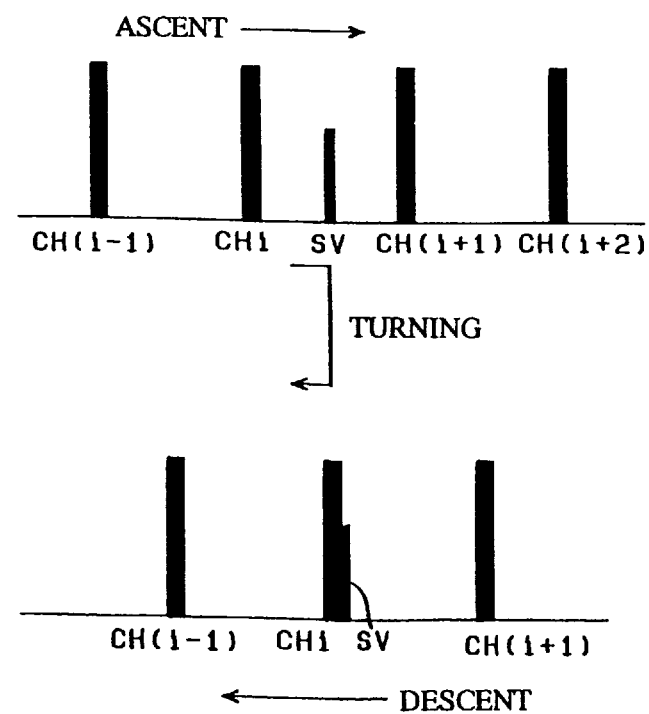
FIG. 5 illustrates another example of the arrangement of ascent and descent channel slots in the surveillance method of the optical amplifier-repeater transmission system according to the present invention.

FIG. 5 shows the foregoing case, in which the channel slots of the descent transmission signals are arranged in the middle of the channel slots of the ascent transmission signals.

According to this case, the surveillance signal (SV) located in the middle of the adjoining channel slots [CHi and CH(i+1)] overlaps the channel i of the descent transmission signal. The lower chart in FIG. 5 shows this state, in which the turned surveillance signal (SV) is illustrated in a remarkably higher level than the actual level for the convenience of explanation. Although the ascent transmission signal is also turned, the turned level of the ascent transmission signal is minute, and it is not shown here.

In this case, since the surveillance signal (SV) turned to the descent transmission line overlaps the channel i, the bandpass filter cannot separate a transmission signal having the same wavelength as the surveillance signal from the surveillance signal, thus causing interference with the transmission signal. In order not to give a bad influence if the surveillance signal interferes with the transmission signal, it is necessary to beforehand set the level of the surveillance signal interposed in the middle of the adjacent channel slots [CHi and CH(i+1)] to about $1/10$ of the transmission signal level.

When the transmission signal overlaps the surveillance signal as shown in the conventional example, the modulation rate of the surveillance signal is about 2%, whereas the modulation rate of the surveillance signal in the present invention is possible to set to 100%. Therefore, the turned signal intensity can be made 5-fold even if the level of the surveillance signal is made $1/10$. Therefore, the time required for the correlation detection using the PN (pseudo noise) signal reduces to $(1/5)2$, i.e., $1/25$, thus speeding up the detection.

In the aforementioned surveillance method of the optical amplifier-repeater transmission system according to the present invention, the wavelength spacing of the channel slots multiplexed in wavelength can be set to, for example, 1 nm.

Furthermore, in the surveillance method of the optical amplifier-repeater transmission system according to the present invention, by providing an arrangement wherein the surveillance light signal transmits only for a specific time, the surveillance may be done only when the surveillance light signal is transmitted. And, plural surveillance light signals may be applied. Moreover, while switching the location where the surveillance light signal is interposed between the adjacent channel slots and transmitting the surveillance light signal for each specific time, the surveillance may be performed such that the surveillance light signal is received by switching the reception wavelength of the surveillance light signal synchronously with the switching of the surveillance light signal.

Furthermore, the wavelength of the surveillance light signal is preferably set in a wavelength band close to the wavelength giving the maximum gain in the gain vs. wavelength characteristics of the optical amplifier built in the optical repeater.

According to the present invention described hereinabove, since an intensity-modulated surveillance light signal is designed to be interposed between light channel slots, if the modulation rate of the surveillance light signal is set deeper than the conventional, interference to the transmission signals of the light channel slots is restrained as much as possible. Thereby, the surveillance light signal can be received with a good S/N ratio in a shorter time.

Furthermore, since a new band exclusive for the surveillance is not needed, the wavelength band can be used efficiently.

Moreover, applying the spread spectrum to the carrier for the surveillance signal spreads the frequency components of the carrier for the surveillance signal; and the spectrum power density of the carrier becomes low, thus reducing the interference to the transmission signal as much as possible.

Thus, according to the present invention, the surveillance can be done without preparing a wavelength slot exclusively for the surveillance signal. Furthermore, although difficult in the conventional method, the waveband measurement of the optical amplifier becomes possible and the measurement can be completed in a very short time. Thereby, it becomes possible to accurately find the degradation of the transmission characteristics of plural transmission signals resulting from troubles in the transmission lines, and an advanced surveillance system can be realized.

While the specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A surveillance method of an optical amplifier-repeater transmission system, in the optical amplifier-repeater transmission system constructed by interposing optical repeaters in which a pair of ascent and descent optical amplifiers are incorporated into a pair of ascent and descent optical fiber transmission lines, the surveillance method comprising:

transmitting an ascent and descent transmission signal through a pair of the ascent and descent optical fiber transmission lines, comprising a plurality of optical channel slots arrayed on a light wavelength axis and at least one surveillance light signal interposed into a wavelength band between the adjacent optical channel slots, and providing turned signals by optical turn circuits in the optical repeaters, which turn the ascent transmission signal to the descent optical fiber transmission line with an appropriate loss and turn the descent transmission signal to the ascent optical fiber transmission line with an appropriate loss;

and performing, wherein the surveillance of the optical repeaters and optical fiber transmission lines by extracting the surveillance light signals contained in the signals turned in the optical repeaters in an ascent and descent terminal station equipment.

2. A surveillance method of the optical amplifier-repeater transmission system, as claimed in claim 1, wherein the surveillance light signal is produced in such a manner that a light signal is modulated in intensity by a surveillance carrier with a spread spectrum applied.

3. A surveillance method of the optical amplifier-repeater transmission system, as claimed in claim 1, wherein a plurality of the surveillance light signals are interposed between the light channel slots always or for a specific time and the surveillance light signals are received in the ascent and descent terminal station equipment with all the surveillance light signals or by switching so as to synchronize with the time that the surveillance light signals are interposed between the light channel slots.

4. A surveillance method of the optical amplifier-repeater transmission system, as claimed in claim 2, wherein a plurality of the surveillance light signals are interposed between the light channel slots always or for a specific time and the surveillance light signals are received in the ascent and descent terminal station equipment with all the surveillance light signals or by switching so as to synchronize with the time that the surveillance light signals are interposed between the light channel slots.

5. A surveillance method of the optical amplifier-repeater transmission system, as claimed in claim 1, wherein a wavelength of the surveillance light signal is set in a wavelength band close to a wavelength giving a maximum gain of the gain wavelength characteristics of the optical amplifier in the optical repeater.

6. A surveillance method of the optical amplifier-repeater transmission system, as claimed in claim 2, wherein a wavelength of the surveillance light signal is set in a wavelength band close to a wavelength giving a maximum gain of the gain wavelength characteristics of the optical amplifier in the optical repeater.

7. A surveillance method of the optical amplifier-repeater transmission system, as claimed in claim 3, wherein a wavelength of the surveillance light signal is set in a wavelength band close to a wavelength giving a maximum gain of the gain wavelength characteristics of the optical amplifier in the optical repeater.

8. A surveillance method of the optical amplifier-repeater transmission system, as claimed in claim 4, wherein a wavelength of the surveillance light signal is set in a wavelength band close to a wavelength giving a maximum gain of the gain wavelength characteristics of the optical amplifier in the optical repeater.

\* \* \* \* \*